US00RE35301E

United States Patent [19]

Reichow

[11] E Patent Number: Re. 35,301

[45] Reissued Date of Patent: Jul. 23, 1996

[54] ON-BOARD LOAD CELL

[75] Inventor: Keith Reichow, Renton, Wash.

[73] Assignee: Stress-Tek, Inc., Kent, Wash.

[21] Appl. No.: 270,256

[22] Filed: Jul. 5, 1994

Related U.S. Patent Documents

Reissue of:

[64] Patent No.: 4,666,003
Issued: May 19, 1987
Appl. No.: 776,911
Filed: Sep. 17, 1985

[51] Int. Cl.[6] ..... G01G 19/08; G01L 1/04

[52] U.S. Cl. ..... 177/136; 177/211; 73/862.632

[58] Field of Search ..... 177/136, 211; 73/862.632

[56] References Cited

U.S. PATENT DOCUMENTS

| | | | |
|---|---|---|---|
| 3,565,196 | 2/1971 | Laimins et al. | 177/211 |
| 3,602,866 | 8/1971 | Saxl | 177/211 |
| 3,661,220 | 5/1972 | Harris | 177/136 |
| 3,734,216 | 5/1973 | Nordstrom et al. | 177/136 |
| 3,857,452 | 12/1974 | Hartman | 177/139 |
| 3,990,032 | 11/1976 | Fish et al. | 177/136 X |
| 4,249,623 | 2/1981 | McCauley | 177/136 |
| 4,305,475 | 12/1981 | Wacker | 177/147 |
| 4,364,279 | 12/1982 | Stern et al. | 73/862.632 |
| 4,420,985 | 12/1983 | Raskin | 73/862.632 |
| 4,459,863 | 7/1984 | Nordstrom | 73/862.66 |
| 4,503,921 | 3/1985 | Polen | 177/147 |
| 4,516,645 | 5/1985 | Wetzel | 177/147 |
| 4,516,646 | 5/1985 | Bergfalk | 177/211 |
| 4,549,622 | 10/1985 | Leiman | 177/134 |
| 4,581,948 | 4/1986 | Reichow | 73/862.632 |

OTHER PUBLICATIONS

Sensortronics (drawing and specification)—4 pages.
Transducers, Inc. (brochure).
Maywood Instruments (2 drawings).
Botek (2 sheets).
Strainometrics.

*Primary Examiner*—Peter S. Wong
*Assistant Examiner*—Randy W. Gibson
*Attorney, Agent, or Firm*—Jensen & Puntigam

[57] ABSTRACT

A load cell for on-board weighing applications, including an elongated sheer force measuring beam (24) which includes mounting means (52,54,56) for securing the opposing longitudinal ends of the beam (24) to the frame (58) of the vehicle. The load is applied against the upper surface (32) of the beam (24) through a platform (20) or the like. The shear strains caused by the load are concentrated in an area near each end of the beam (24). The strain measuring means (30) are located in holes in the sides of the beam in the shear force areas and measure the shear strains on the beam, which in turn are representative of the weight of the load.

11 Claims, 2 Drawing Sheets

FIG. 1
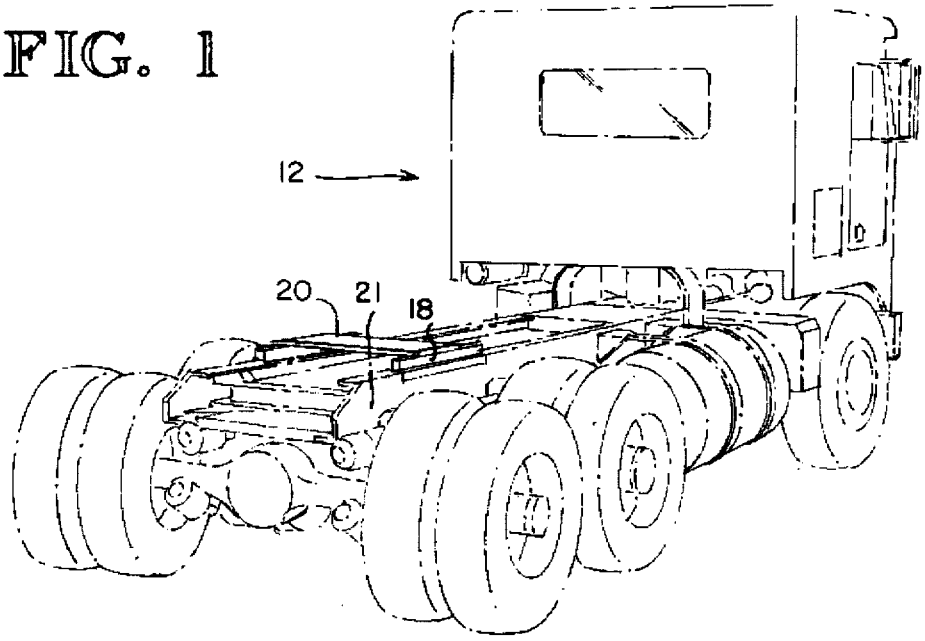
FIG. 2
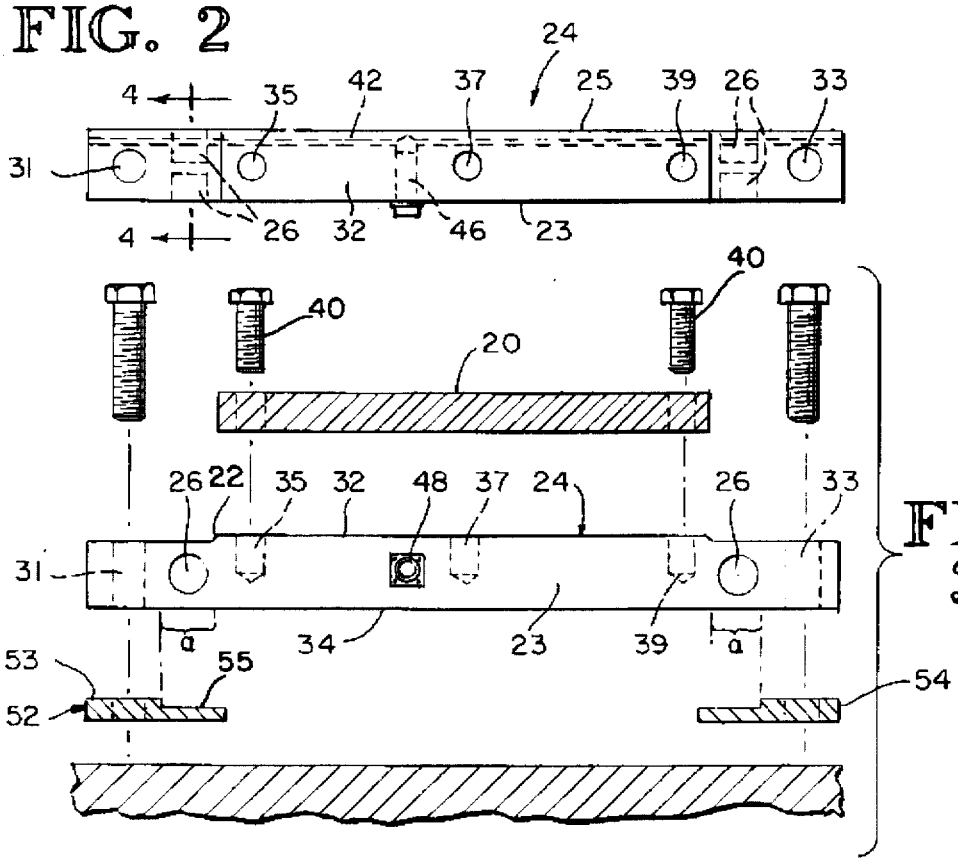
FIG. 3

ON-BOARD LOAD CELL

Matter enclosed in heavy brackets [ ] appears in the original patent but forms no part of this reissue specification; matter printed in italics indicates the additions made by reissue.

DESCRIPTION

1. Technical Field

This invention relates generally to the art of load cells used in weighing systems, and more specifically concerns such a load cell used in weighing systems which are located on a vehicle.

2. Background Art

Weighing systems for on-board applications have typically used a bending beam type load cell, such as shown in U.S. Pat No. 4,249,623 to McCauley and U.S. Pat. No. 3,661,220 to Harris. However, these load cells have in use experienced difficulties with breakage and cracking in particular areas of the load cell. Further, debris, including snow, ice, and mud, frequently accumulates in the area directly beneath the lower surface of the load cell beam, inhibiting the bending of the load cell, which in turn impairs the accuracy of the reading.

Still further, such load cells have proven to be vulnerable to moisture. The strain gauges which are used in the load cells are very sensitive to moisture, even changes in humidity, and prior art on-board load cells have been difficult to protect against moisture, even with the application of state-of-the-art potting and/or sealing methods and materials. The above-described disadvantages result in a relatively high failure rate for conventional on-board load cells, which can impair the safe operation of the vehicle, increases operational expense and is frustrating to the operators of the vehicles.

To solve or reduce these problems, applicant has developed a double ended shear beam-type load cell for use in on-board weighing applications.

DISCLOSURE OF THE INVENTION

Accordingly, the invention includes an elongated beam which is responsive to shear force, including means for mounting the beam on a vehicle and means for receiving the force of the load of the vehicle, wherein the shear force on the beam as a result of the vehicle load is located in shear areas in the vicinity of each longitudinal end of the beam; and strain measuring means positioned in the shear area for measuring the shear strains on the beam, which are representative of the weight of the vehicle load.

BRIEF DESCRIPTION OF THE DRAWINGS

FIG. 1 is an isometric view of a vehicle which shows the present invention positioned thereon.

FIG. 2 is a top view of the load cell of the present invention.

FIG. 3 is an exploded elevational view of the load cell of FIG. 2, showing also a portion of the structure for mounting the load cell on the vehicle and for receiving the load from the vehicle.

BEST MODE FOR CARRYING OUT THE INVENTION

As shown in FIG. 1, a conventional load vehicle, such as a logging truck, includes a tractor 12 and a trailer (not shown) which carries the load and is releasably connected to tractor 12. Although the embodiment disclosed herein is specific to a logging truck application, which is a common application for load cells, it should be understood that the present invention is also useful in other on-board vehicle applications, such as for suspension and fifth wheel load monitoring. The on-board load cell shown generally at 18 is connected through a mounting structure, as described hereinafter, to the frame 21 of the vehicle along the opposing sides of the vehicle near the drive axles of the tractor portion of the vehicle. In the embodiment shown, the load cells extend longitudinally of the vehicle. The details of the mounting structure, by which the load cells are connected to the frame of the vehicle, is described in succeeding paragraphs and shown in FIG. 5. In a logging truck application, a cross beam 20 extends laterally across the vehicle, with its opposing ends being connected to the top surface of the respective opposing load cells. Cross beam 20 supports the load on the vehicle.

Figure 4:
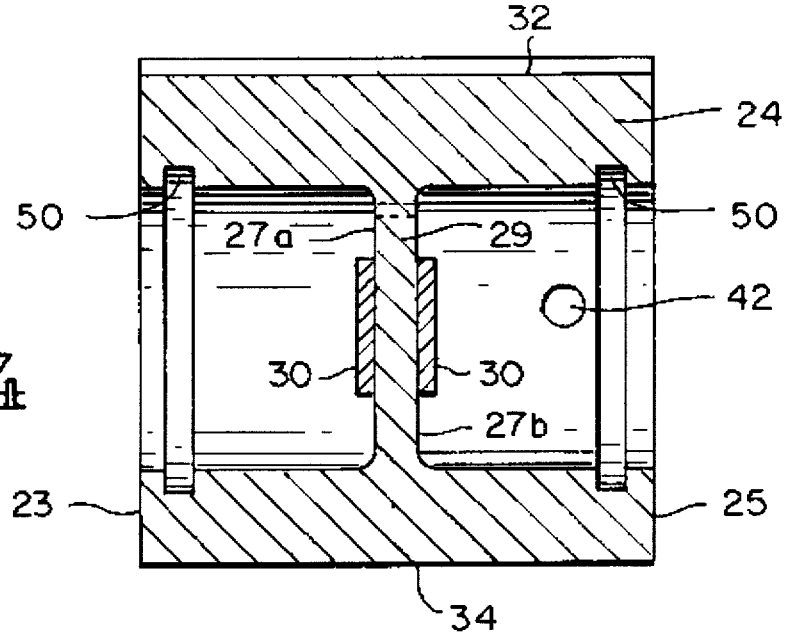
FIG. 4 is a cross-sectional view taken along lines 4—4 in FIG. 2, showing also the position of the strain gauges for the load cell.

FIGS. 2–4 show the load cell of the present invention. The load cell comprises an elongated beam 24, substantially square in cross-section, which in the embodiment shown comprises a high strength, high quality steel. The specific beam shown in 26 inches long, and is 2.3 inches square.from the center of the bar until approximately 4.5 inches from each end, at which point the height of the bar decreases approximately 0.125 inches. The transition in the upper surface is radiused at 22. Thus, the height of the beam is slightly less at the ends of the beam than at the center. In both side surfaces 23, 25 of the beam 24, in the vicinity of each end of the beam, are holes 26—26 to house the strain gauges for the load cell. In the embodiment shown, the holes are circular, each with a diameter of 1.35 inches, with the center of each hole being located 3.5 inches in from each end. Positioned against the end surfaces 27a, 27b of the holes, i.e. the web 29, are the strain gauges 30–30 (FIG. 4), which will be described in more detail hereinafter.

Two openings 31, 33 which extend completely through the beam from the top surface 32 to the lower surface 34 thereof are provided for connection of the beam to its mounting structure. In the embodiment shown, the openings are circular, 1.16 inches in diameter, and have a center located approximately 1.4 inches from the respective ends.

Three threaded holes 35, 37, 39 are provided to permit the secure attachment of a cross beam 20 to the top surface 32 of beam 24. In the embodiment shown, the openings are threaded to accept a 1–14 UNF bolt and are 1.25 inches deep. One opening 37 has a center located at the center of the beam 24, while the other two openings 35, 39 are spaced 7.5 inches toward the opposing ends thereof. Bolts 40—40 are used to attach the beam 20 or equivalent platform to the top surface of the beam.

FIG. 4 shows a cross-section of the beam through the openings 26—26. In the embodiment shown, strain gauges are placed on the opposing surfaces 27a, 27b of the web 29. The strain gauges are conventional, with one tension gauge and one compression gauge at each end of the beam 24. Electrical leads (not shown) extend from the gauges through a longitudinal opening 24 in the bar 24 which, referring to FIG. 2 in particular, extends longitudinally of the bar from one end of the bar to the other, approximately mid-height of the bar. The opening 42 is drilled, is approximately 3/16 inches in diameter, and is capped and sealed at both ends.

The longitudinal opening 42 intersects a lateral cavity 46, which is slightly off center relative to the length of the bar, and which opens onto a side surface 23 of the bar 24. A connector 48 is secured on side surface 23 over the cavity 46 and provides the electrical connection for the signal output of the load cell. Thus, leads from each strain gauge 30—30 in the load cell extend through opening 42 to cavity 46. Thus, all of the electrical leads for the load cell, specifically, the leads from the strain gauges, are routed internally of the beam 24. The strain gauges are connected into a conventional Wheatstone bridge circuit, including any trimming resistors, in cavity 46, and the output lead from the bridge circuit is connected to the connector 48.

The holes 26—26 for the strain gauges 30–30, the longitudinal opening 42 and the cavity 46 are filled with a water-resistent potting material. The holes 26—26 have undercut portions 50—50 near the two side surfaces 23, 25 as shown in FIG. 4, which provide additional sealing and retention improvement for the potting material in holes 26—26, and hence, additional moisture protection.

The beam 24 is configured and mounted to measure shear force on the beam in the area labeled "a" in FIG. 2 near each end of the beam, where the holes 26 are located. Area "a" is bounded by the edges of the load platform and the edges of the portion of the mounting structure which abuts against the bottom surface of the beam 24.

Although shear type load cells per se are known, they are usually found in single ended configurations and they have not heretofore been used in a double-ended configuration for on-board weighing applications. As noted above, the direction of the art in on-board applications over the past 15–20 years has been toward the use of bending beam type load cells, such as shown in the '623 and '220 patents noted above.

In the present invention, the strain gauges are placed in an area of the beam where there is relatively little bending action, and where the shear forces are concentrated. Further, what bending force there is will typically be cancelled in the bridge circuit, so that the resulting force measured by the strain gauges is substantially shear force only. The shear force is measured over a relatively short distance, so that the load cell itself can be relatively short, if desired, and does not have to be any particular length to operate properly. Thus, there is flexibility in installation on vehicles. Further, the vertical displacement of the beam under load is substantially less than that for a bending beam, so that accumulation of snow, ice and other debris beneath the beam will have less of an impact on the accuracy of the reading of the load cell.

Figure 5:
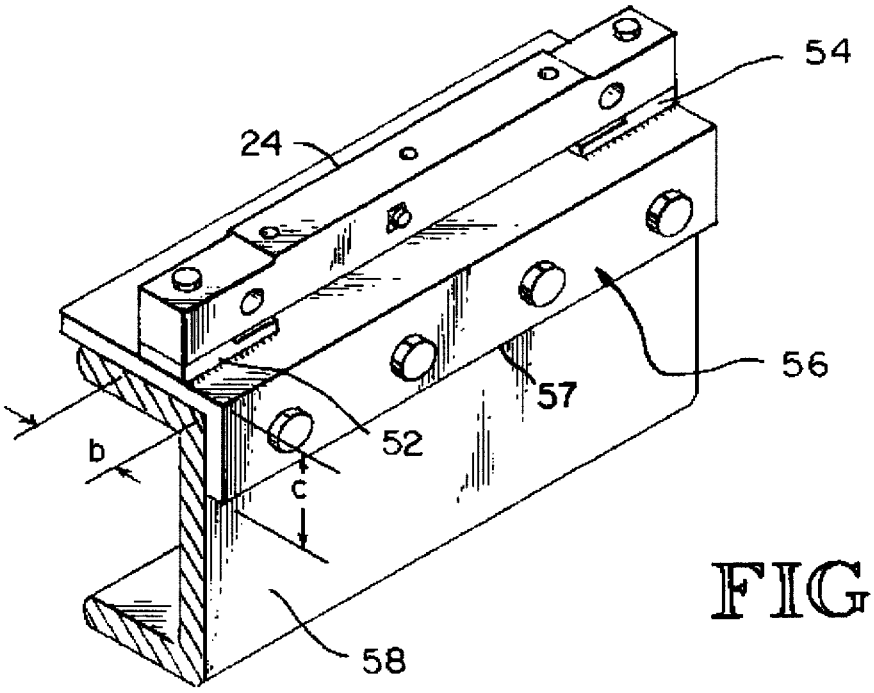
FIG. 5 shows the structure for mounting the load cell of FIGS. 2–4 to the frame of the vehicle.

The mounting structure for the load cell on the vehicle is shown in FIGS. 3 and 5. FIG. 2 shows in addition the cross beam 20, and its attachment by means of three bolts (2 are shown) to the top surface of the load cell, as already discussed. In the embodiment shown, the cross beam 20 is 17 inches wide, leaving 4½ inches to each side of beam 24 for a 26 inch load cell. Both ends of beam 24 are fixed in position in the present invention.

The mounting structure includes two mounting plates 52 and 54, one for each end of the beam. Each mounting plate is an elongated steel plate with a base portion thereof 53 being approximately 1 inch thick, 2.3 inches wide and 2.65 inches long. The base portion is positioned right at the end of the beam; the upper surface of the base portion of the mounting plate abuts the lower surface 34 of the beam 24 and the mounting plate is secured to the beam by bolts. Each mounting plate also has a lip portion 55, which extends from the base portion 53 beneath the beam 24. The lower surface and the side surfaces of the lip portion are a continuation of corresponding surfaces of the base of the mounting plates. The upper surface of the lip portion is approximately ⅛ inch from the lower surface of the beam, so that there is a small separation between the beam and the lip portion.

The mounting plates 52 and 54 are welded to a section of angle iron 56 which is approximately ⅜ inch thick and which has a length which is equal to or longer than the length of the beam. In the embodiment shown, dimension "b" of the angle iron 56 is 5 inches and dimension "c" is 5 inches. The vertical surface 57 of the angle iron 54 has a series of openings therein. The angle iron is bolted to the frame 58 of the vehicle through these openings. This arrangement provides the required mounting for the load cell, without having any welds which directly connect the frame of the vehicle to the mounting structure, or which connect the mounting structure to the load cell.

Thus, an on-board load cell has been described which is arranged and configured so as to measure shear force in a beam. The load cell is configured to minimize the possibility of breakage and cracking of the load cell, as well as being protected against moisture penetration of the strain gauges.

Although a preferred embodiment of the invention has been disclosed herein for purposes of illustration, it should be understood that modifications and substitutions can be incorporated in the invention without departing from the spirit of the invention as defined by the claims which follow.

I claim:

[1. A load cell adapted to be mounted on a vehicle for on-board weighing of vehicle loads, wherein the load cell is capable of withstanding high bending loads, including side-loads, in addition to the vehicle load, the load cell comprising:

an elongated beam configured to be responsive to shear force, including means for mounting the beam on a vehicle and means for receiving the force of the vehicle load, wherein the beam is configured and arranged such that the shear strain on the beam is greatest in shear areas which are located in the vicinity of each longitudinal end of the beam, wherein the beam is characterized by a lack of flexure isolation means; and strain measuring means positioned in the shear areas for measuring the shear strains on the beam caused by the vehicle load, the measured shear strain being representative of the weight of the vehicle load.]

[2. An apparatus of claim 1, wherein said beam is mounted to the frame of the vehicle at each longitudinal end of the beam.]

[3. An apparatus of claim 2, wherein the shear area longitudinally bounded along the beam by said means for receiving the force of the load and said means for mounting the beam at the longitudinal ends thereof.]

[4. An apparatus of claim 3, including a cavity in said beam which is adapted to contain selected circuitry to process the signals from the strain measuring means and further including a small diameter opening which extends substantially the entire length of the beam, connecting said holes for said strain measuring means and said central cavity, so that any electrical connections can be routed internally of the load cell.]

[5. An apparatus of claim 3, wherein said beam includes holes having bottom surfaces in the side surfaces of the beam in the shear area of the beam, and wherein said strain measuring means are located on the bottom surface of said holes.]

[6. An apparatus of claim 5, wherein the holes in the beam at the same end thereof are in registry and wherein the holes have such a depth that the thickness of the web between the respective bottom surfaces of the holes is small relative to the width of said beam.]

[7. An apparatus of claim 6, wherein the holes are relatively small compared to the length of said beam, and are sealed with water resistant material so as to protect the strain measuring means from moisture.]

[8. An apparatus of claim 7, including an undercut in the side surface of the holes, which tends to improve the sealing of the holes.]

[9. An apparatus of claim 1, wherein the shear areas are webs defined between two opposed, inwardly directed openings in the longitudinal sides of the beam, wherein the webs are rectangular in cross-section.]

*10. A load cell adapted to be mounted on a vehicle for on-board weighing of vehicle loads, wherein the load cell is capable of withstanding high bending loads, including side-loads, in addition to the vehicle load, the load cell comprising:*

*an elongated beam configured to be responsive to shear force, including means for mounting the beam to the frame of the vehicle at each longitudinal end of the beam and means for receiving the force of the vehicle load, wherein the beam is configured and arranged such that the shear strain on the beam is greatest in shear areas which are located in the vicinity of each longitudinal end of the beam, the shear areas being longitudinally bounded along the beam by said means for receiving the force of the load and said means for mounting the beam at the longitudinal ends thereof, wherein the beam includes holes, having bottom surfaces, in side surfaces of the beam in the shear areas of the beam, wherein the beam is characterized by a lack of flexure isolation means; and*

*strain measuring means located on the bottom surfaces of said holes for measuring the shear strains on the beam caused by the vehicle load, the measured shear strain being representative of the weight of the vehicle load, wherein the holes in the beam which are at the same end thereof are in registry and wherein the holes have such a depth that the thickness of the web between the respective bottom surfaces of the holes is small relative to the width of said beam.*

*11. An apparatus of claim 10, including a cavity in said beam which is adapted to contain selected circuitry to process the signals from the strain measuring means and further including a small diameter opening which extends substantially the entire length of the beam, connecting said holes for strain measuring means and said cavity, so that any electrical connections can be routed internally of the load cell.*

*12. An apparatus of claim 10, wherein the holes are relatively small compared to the length of said beam and are sealed with water resistant material so as to protect the strain measuring means from moisture.*

*13. An apparatus of claim 12, including an undercut in the side surface of the holes, which tends to improve the sealing of the holes.*

*14. A load cell adapted to be mounted on a vehicle for on-board weighing of vehicle loads, wherein the load cell is capable of withstanding high bending loads, including side-loads, in addition to the vehicle load, the load cell comprising:*

*an elongated beam configured to be responsive to shear force, including means for mounting the beam on a vehicle and means for receiving the force of the vehicle load, wherein the beam is configured and arranged such that the shear strain on the beam is greatest in shear areas which are located in the vicinity of each longitudinal end of the beam, wherein the shear areas are webs defined between two opposed, inwardly directed openings in the longitudinal sides of the beam, wherein the webs are rectangular in cross-section, and wherein the beam is characterized by a lack of flexure isolation means; and*

*strain measuring means positioned in the shear areas for measuring the shear strains on the beam caused by the vehicle load, the measured shear strain being representative of the weight of the vehicle load.*

*15. A load cell adapted to be mounted on a vehicle for on-board weighing of vehicle loads, wherein the load cell is capable of withstanding high bending loads, including side-loads, in addition to the vehicle load, the load cell comprising:*

*an elongated beam configured to be responsive to shear force, including means for mounting the beam to the frame of the vehicle and means for receiving the force of the vehicle load, wherein the beam is configured and arranged such that the shear strain on the beam is greatest in shear areas which are located in the vicinity of each longitudinal end of the beam, wherein said beam includes holes, having bottom surfaces, which extend inwardly from side surfaces of the beam in the shear areas of the beam, the holes which are at the same end of the beam being substantially in registry, such that a web is defined between the bottom surfaces of the holes, and wherein the beam is characterized by a lack of flexure isolation means; and*

*strain measuring means located on opposing surfaces of the web for measuring the shear strains on the beam caused by the vehicle load, the measured shear strain being representative of the weight of the vehicle load.*

*16. An apparatus of claim 15, wherein the holes are relatively small compared to the length of said beam and are sealed with water resistent material so as to protect the strain measuring means from moisture.*

*17. An apparatus of claim 16, including an undercut in the side surface of the holes, which tends to improve the sealing of the holes.*

*18. An apparatus of claim 15, including means for mounting the beam to the frame of the vehicle at each longitudinal end of the beam and wherein the shear areas are longitudinally bounded along the beam by said receiving means and said mounting means.*

*19. An apparatus of claim 15, wherein the strain measuring means are located on opposing surfaces of the web.*

*20. A load cell adapted to be mounted on a vehicle for on-board weighing of vehicle loads, wherein the load cell is capable of withstanding high bending loads, including side loads, in addition to the vehicle load, the load cell comprising:*

*an elongated beam configured to be responsive to shear force, including means for mounting the beam on a vehicle and means for receiving the force of the vehicle load, wherein the beam is configured and arranged such that the shear strain on the beam is greatest in shear areas which are located in the vicinity of each longitudinal end of the beam, wherein the shear areas include webs defined between two opposed inwardly directed openings in the longitudinal sides of the beam,*

*and wherein the beam is characterized by a lack of flexure isolation means; and*

*at least one strain measuring means positioned on each of the webs for measuring the shear strains on the beam*

*caused by the vehicle load, the measured shear strain being representative of the weight of the vehicle load.*

* * * * *